(12) United States Patent
Lewkow (10) Patent No.: US 9,083,873 B1
(45) Date of Patent: Jul. 14, 2015

(54) DEVICES AND METHODS FOR PROVIDING MULTI-APERTURE LENS FUNCTIONALITY

(71) Applicant: Google Inc., Mountain View, CA (US)

(72) Inventor: Roman Lewkow, Mountain View, CA (US)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/852,652

(22) Filed: Mar. 28, 2013

(51) Int. Cl.
*H04N 5/232* (2006.01)
*G03B 13/00* (2006.01)
*H04N 5/225* (2006.01)
*G02B 7/02* (2006.01)
*G03B 3/00* (2006.01)

(52) U.S. Cl.
CPC .............. *H04N 5/2257* (2013.01); *G02B 7/021* (2013.01); *G03B 3/00* (2013.01); *H04N 5/2258* (2013.01); *H04N 5/23212* (2013.01)

(58) Field of Classification Search
None
See application file for complete search history.

(56) References Cited

U.S. PATENT DOCUMENTS

| | | | |
|---|---|---|---|
| 7,209,294 B2 | 4/2007 | Takahashi | |
| 7,769,284 B2 | 8/2010 | Tang et al. | |
| 2010/0328471 A1* | 12/2010 | Boland et al. | 348/207.99 |
| 2011/0176020 A1* | 7/2011 | Chang | 348/222.1 |
| 2012/0195570 A1 | 8/2012 | Ishida et al. | |
| 2012/0300088 A1* | 11/2012 | Terajima | 348/208.7 |
| 2013/0201391 A1* | 8/2013 | Ogasahara et al. | 348/374 |

FOREIGN PATENT DOCUMENTS

| | | |
|---|---|---|
| JP | 2004096656 | 3/2004 |
| KR | 20050057938 | 6/2005 |

* cited by examiner

*Primary Examiner* — Sinh Tran
*Assistant Examiner* — Shahbaz Nazrul
(74) *Attorney, Agent, or Firm* — McDonnell Boehnen Hulbert & Berghoff LLP (57) ABSTRACT

Devices and methods for providing multi-aperture lens functionality are provided. In one example, a device is provided that comprises a plurality of optical element assemblies configured to focus light. The device also includes a shared frame coupled to each of the plurality of optical element assemblies and configured to maintain the plurality of optical element assemblies in a fixed spatial arrangement. A position of the shared frame corresponds to a focus setting of the device. The device also comprises an actuator coupled to the shared frame and configured to cause a change in the position of the shared frame corresponding to a change in the focus setting of the device. The change in the position of the shared frame causes the plurality of optical element assemblies to be configured in the changed focus setting of the device.

14 Claims, 5 Drawing Sheets

DEVICES AND METHODS FOR PROVIDING MULTI-APERTURE LENS FUNCTIONALITY

BACKGROUND

Unless otherwise indicated herein, the materials described in this section are not prior art to the claims in this application and are not admitted to be prior art by inclusion in this section.

A camera lens is an optical lens or an assembly of lenses used with a camera body to capture images of objects. The images may be stored on photographic film or on other media capable of storing the image chemically or electronically. Example cameras may include still cameras, video cameras, telescopes, microscopes or other apparatus.

In some examples, example camera lens may include multiple lens assemblies that are each coupled to a frame and an actuator to change a focus of each of the multiple lens assemblies independently. The frame and the actuator that are coupled to each of the multiple lens assemblies may consume power to accomplish the change in focus. The camera lens may be housed in an enclosure that also houses the frame and the actuator coupled to each of the multiple lens assemblies. The frame and the actuator may also take up additional space in the enclosure.

SUMMARY

In one example, a device is provided that comprises a plurality of optical element assemblies configured to focus light. The device also comprises a shared frame coupled to each of the plurality of optical element assemblies and configured to maintain the plurality of optical element assemblies in a fixed spatial arrangement. The plurality of optical element assemblies may be configured in a focus setting of the device that corresponds to a position of the shared frame. The device also comprises an actuator coupled to the shared frame and configured to cause a change in the position of the shared frame. The change in the position of the shared frame corresponds to a change in the focus setting of the device and may cause the plurality of optical element assemblies to be configured in the changed focus setting of the device.

In another example, a method is provided comprising providing a plurality of optical element assemblies that are configured to focus light. The method also comprises providing a shared frame coupled to each of the plurality of optical element assemblies and configured to maintain the plurality of optical element assemblies in a fixed spatial arrangement. The plurality of optical element assemblies may be configured in a focus setting that corresponds to a position of the shared frame. The method also comprises causing an actuator coupled to the shared frame to change the position of the shared frame. The change in the position of the shared frame corresponds to a change in the focus setting and causes the plurality of optical element assemblies to be configured in the changed focus setting.

In still another example, a device is provided that comprises a plurality of optical element assemblies configured to focus light. The device also comprises a shared frame coupled to each of the plurality of optical element assemblies and configured to maintain the plurality of optical element assemblies in a fixed spatial arrangement. The plurality of optical element assemblies may be configured in a focus setting of the device that corresponds to a position of the shared frame. The device also comprises a plurality of image sensors aligned with the plurality of optical element assemblies and configured to receive light focused by the plurality of optical element assemblies. The device also comprises an actuator coupled to the shared frame and configured to cause a change in the position of the shared frame. The change in the position of the shared frame corresponds to a change in the focus setting of the device and may cause the plurality of optical element assemblies to be configured in the changed focus setting.

In another example, a device is provided comprising a means for providing a plurality of optical element assemblies that are configured to focus light. The device also comprises a means for providing a shared frame coupled to each of the plurality of optical element assemblies and configured to maintain the plurality of optical element assemblies in a fixed spatial arrangement. The plurality of optical element assemblies may be configured in a focus setting that corresponds to a position of the shared frame. The device also comprises a means for causing an actuator coupled to the shared frame to change the position of the shared frame. The change in the position of the shared frame corresponds to a change in the focus setting and causes the plurality of optical element assemblies to be configured in the changed focus setting.

These as well as other aspects, advantages, and alternatives, will become apparent to those of ordinary skill in the art by reading the following detailed description, with reference where appropriate to the accompanying figures.

DETAILED DESCRIPTION

The following detailed description describes various features and functions of the disclosed systems and methods with reference to the accompanying figures. In the figures, similar symbols identify similar components, unless context dictates otherwise, and some components within the figures may not necessarily be drawn to scale for illustration purposes. The illustrative system and method embodiments described herein are not meant to be limiting. It may be readily understood that certain aspects of the disclosed systems and methods can be arranged and combined in a wide variety of different configurations, all of which are contemplated herein.

Within multi-aperture lens modules, it may be desirable to change a position of multiple lens assemblies included in the multi-aperture lens module at a same time to achieve a focus setting. Each of the multiple lens assemblies may utilize an actuator and a frame to accomplish the change in the position. The actuator in each lens assembly may consume power to accomplish the change in the position. In addition, the actuator and the frame for each lens assembly may take up additional space in the multi-aperture lens module.

Example devices described herein may include multi-aperture lens modules that include a shared frame coupled to each lens assembly in the multi-aperture lens module that may utilize a change in a position at a same time to achieve a given focus setting of the device. An actuator coupled to the shared frame is configured to cause the change in the position of the shared frame to achieve the focus setting.

In some example devices, the given focus setting may correspond to the shared frame being in any position along an axis of motion of the shared frame. In other examples, a plurality of distinct focus settings may be provided corresponding to a plurality of positions along the axis of motion of the shared frame.

Within a specific example, a device is provided that includes a plurality of optical element assemblies coupled in a shared frame and an actuator that is configured to cause a change in a position of the shared frame. The shared frame may be configured to maintain the plurality of optical element assemblies in a fixed spatial configuration.

In addition, the device may further be configured to cause the plurality of optical element assemblies to move a substantially same amount of distance by the actuator. In some examples, optical axes of the plurality of optical element assemblies are substantially parallel to an axis of motion of the shared frame. For example, the actuator may cause the change in the position of the shared frame along the axis of motion. The actuator may also cause the plurality of optical element assemblies coupled to the shared frame to move substantially along the axis of motion.

In some examples, the device may be configured to provide a same image focus corresponding to two or more positions of the shared frame. In some instances, it may be desirable that the two or more positions of the shared frame correspond to the same image focus. For example, the change in the position of the shared frame to a first position of the two or more positions may correspond to a different energy requirement compared to the change in the position of the shared frame to a second position of the two or more positions.

In some examples, two or more optical element assemblies may each comprise a plurality of optical elements. The plurality of optical elements included in each of the two or more optical element assemblies, for example, may be configured in a first fixed spatial arrangement such that the two or more optical element assemblies provide a same focus distance. In other examples, a given optical element assembly of the two or more optical element assemblies may include a given plurality of optical elements that is configured in a second fixed spatial arrangement that is different from the first fixed spatial arrangement. Thus, in this example, the given optical element assembly may provide a focus distance that is distinct from the focus distance provided by other optical element assemblies in the two or more optical element assemblies. Specific examples are provided in some of the embodiments described in this section.

In further examples, a first image sensor may be included in the device and is aligned at a given distance with a first optical element assembly of the plurality of optical element assemblies. A second image sensor may also be included in the device and aligned at the given distance from a second optical element assembly to provide a same focus distance as the first optical element assembly. In other examples, the second image sensor may be aligned at a second distance from the second optical element assembly to provide at least two distinct focus distances for the device.

In further examples, the device may include a plurality of image sensors aligned in a second fixed spatial configuration to provide at least two distinct focus distances when the shared frame is in the position corresponding to one focus setting of the device.

Figure 1A:
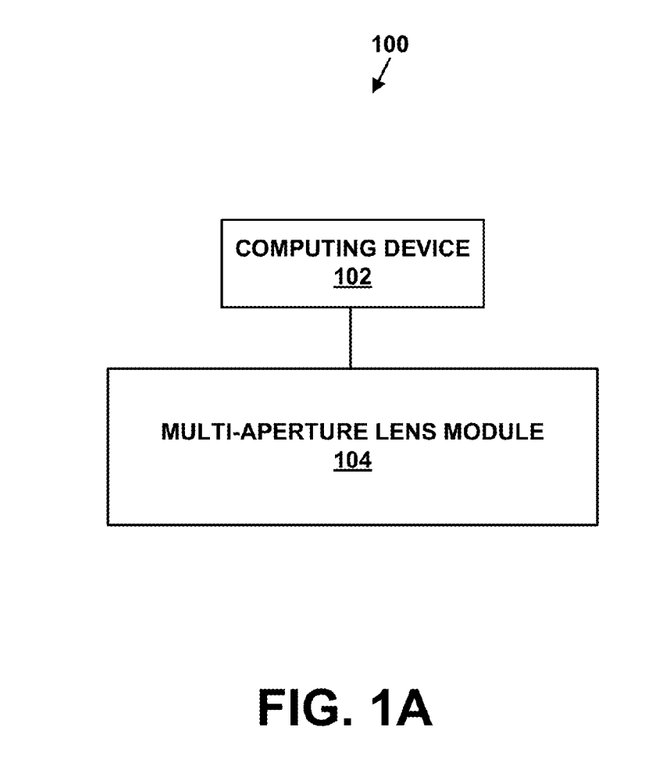
FIG. 1A illustrates a block diagram of an example device.

FIG. 1A illustrates a block diagram of an example device 100. The device 100 may include a computing device 102 that is coupled to a multi-aperture lens module 104. The computing device 102 may be coupled to the multi-aperture lens module 104, for example, mechanically, through electrical circuitry, or by using electrical cables.

The computing device 102, for example, may be or may include a camera, a handheld device, a computer or a head-mounted device. In some examples, the computing device 102 may include a battery to provide power to the computing device 102 and the multi-aperture lens module 104. In other examples, the computing device 102 may receive power from a power unit and provide power to the multi-aperture lens module 104.

The multi-aperture lens module 104 may include image sensors that receive light focused by a plurality of optical element assemblies included in the multi-aperture lens module 104. In other examples, the image sensors may be included in the computing device 102. The multi-aperture lens module 104 may also include a shared frame for the plurality of optical element assemblies and an actuator to cause a change in a position of the shared frame.

The device 100 may be configured to receive light focused by the multi-aperture lens module 104 and provide data indicative of an image represented by the light focused. In some examples, the device 100 may store the data as well or provide the data to a display that may be included in the device 100.

Figure 1B:
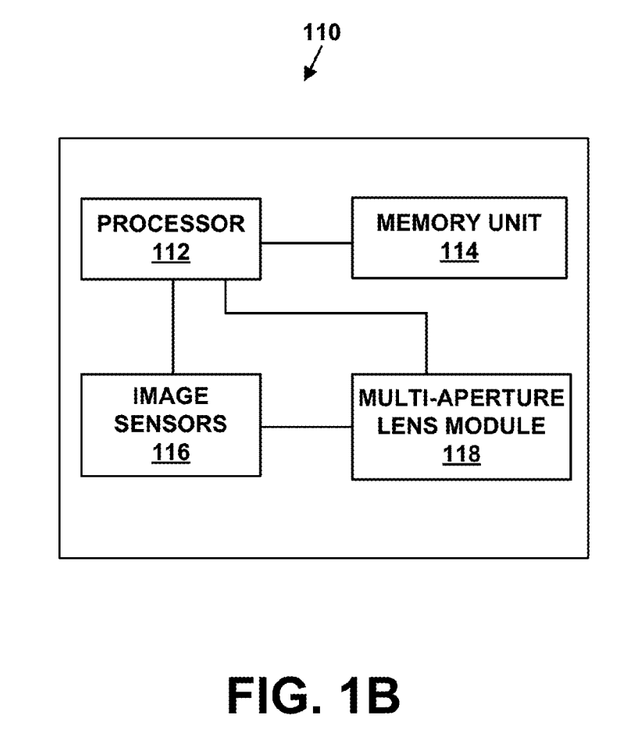
FIG. 1B illustrates another embodiment of an example device.

FIG. 1B illustrates another embodiment of an example device 110. The device 110 may include a processor 112, a memory unit 114 and image sensors 116 to facilitate processing and storage of data from image sensors 116. Image sensors 116, for example, are coupled to a multi-aperture module 118 that is shown included in the device 110, which may be configured to receive light focused by the multi-aperture lens module 118. In some examples, the image sensors 116 may comprise individual sensors. In other examples, the image sensors 116 may comprise a shared semiconductor die that includes an arrangement of a plurality of image sensors.

The device 110, for example, may be or include a camera, a handheld device, a computer or a head-mounted device, or other wearable computing device. In some examples, the device 110 may include a battery to provide power to the device 110 and components included in the device 110. In other examples, the device 110 may receive power from a power unit and provide power to the components included in the device 110. For example the device 110 may include the processor 112, the memory unit 114, image sensors 116, and the multi-aperture lens module 118. The device 110, for example, may also include other circuitry not shown including a driver for the multi-aperture lens module 118.

The processor 112, for example, may be configured to receive data from the image sensors 116 indicative of an image focused by the multi-aperture lens module 118. The processor 112 may further process the data and provide the data for storage in memory unit 114. The processor 112 may also process the data and provide the processed data to a display. The processor 112 may also be configured to provide instructions for the other components in the device 110 to facilitate capturing the image at a correct focus. The instructions may include instructions to drive the multi-aperture lens module 118 to provide a given focus setting of the device 110 that corresponds to a desired image focus.

The memory unit 114 included in FIG. 1B may include static memory or a media storage device. For example, the memory unit 114 may comprise an SD card or a USB memory device. The memory unit 114 may also be configured, for example, to store image data provided by the processor 112 and to provide image data stored on the memory unit 114. The memory unit 114 may also comprise chemical storage. For example, a photography film may be utilized to chemically store the image data.

The image sensors 116 included in FIG. 1B may include, for example, an array of semiconductor pixel sensors (e.g., CMOS sensors or similar devices) configured to receive light focused by the multi-aperture lens module 118 and provide data indicative of the image focused by multi-aperture lens module 118. In some examples, the image sensors 116 may be a charge-coupled device (CCD). The image sensors 116 may be coupled to a printed circuit board and aligned with optical axes of optical element assemblies included in the multi-aperture lens module 118. In other examples, the image sensors 116 may comprise a shared semiconductor die that includes an arrangement of a plurality of image sensors.

The multi-aperture lens module 118 may include a plurality of optical element assemblies configured in a fixed spatial arrangement and coupled to a shared frame. The plurality of optical element assemblies focus light entering the multi-aperture lens module 118 onto the image sensors 116. The multi-aperture lens module 118 may be configured to change a focus setting of the plurality of optical element assemblies due to instructions received from processor 112.

The device 110 may be configured to receive light focused by the multi-aperture lens module 118 onto image sensors 116 and provide data indicative of an image represented by the light focused to the processor 112. For example, the device 110 may utilize the processor 112 to configure the multi-aperture lens module 118 to a given focus setting. The processor 112 may then utilize the image sensors 116 to capture an image generated by multi-aperture lens module 118 and store the image in the memory unit 114. In other examples, the device 110 may utilize processor 112 to process data representing the captured image or retrieve data from memory unit 114, process the data, and provide data for display.

Figure 2:
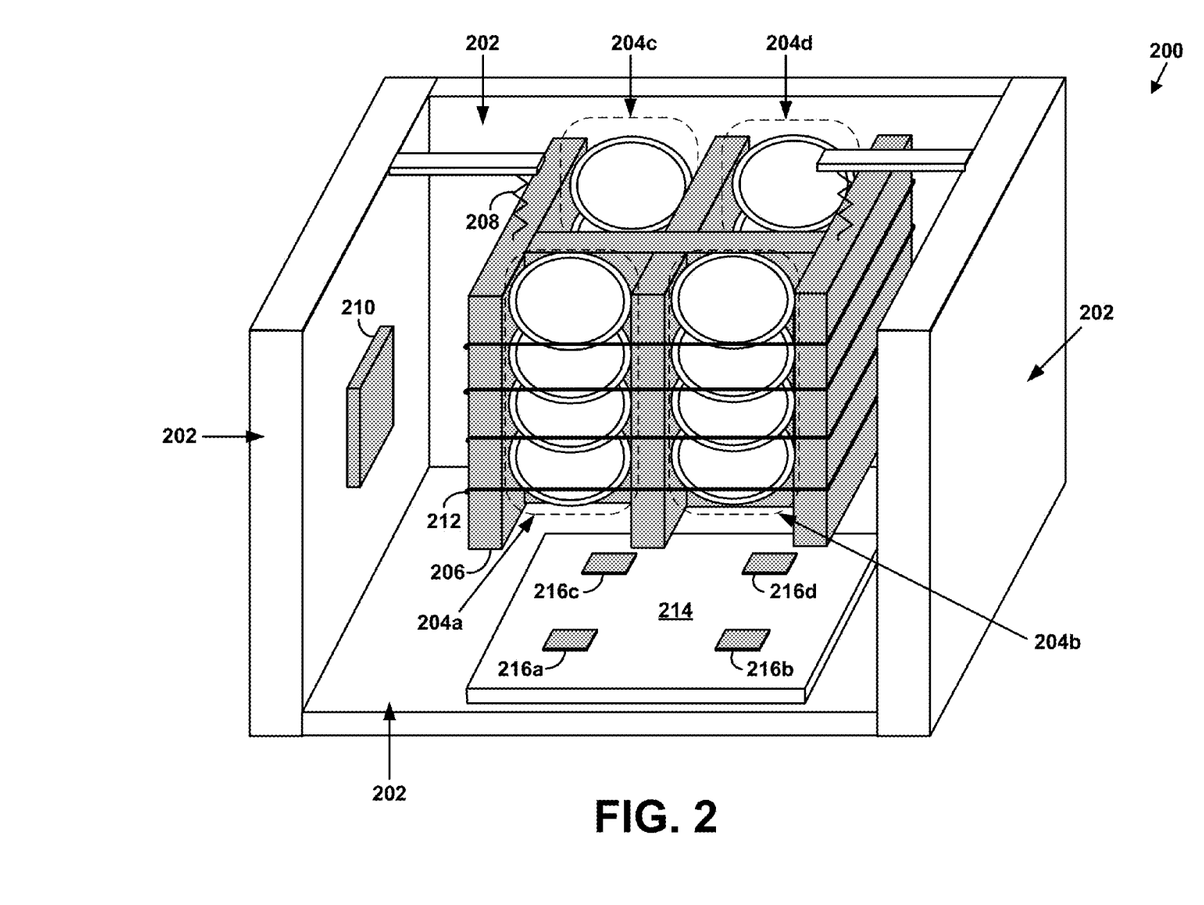
FIG. 2 illustrates another example device.

FIG. 2 illustrates another example device 200. The device 200 may be configured as a multi-aperture lens module. The device 200 may include an enclosure structure 202 that houses the various components of the device 200. The device 200 includes a plurality of optical element assemblies 204*a-d* that are coupled in a fixed spatial arrangement using a shared frame 206. The shared frame 206 maintains the plurality of optical element assemblies 204*a-d* in the fixed spatial arrangement. The shared frame 206 is coupled to the enclosure structure 202 by at least one spring 208. The device 200 also includes at least one magnet 210 that provides a first magnetic field through the shared frame 206. The shared frame 206 is also coupled to an electromagnetic coil 212 that provides a controlled second magnetic field through the shared frame 206. The device 200 also includes a common structure 214 that includes a plurality of image sensors 216*a-d* that are configured to receive light focused by the plurality of optical element assemblies 204*a-d*.

Enclosure structure 202 included in the device 200 may comprise a plastic, metal or composite structure that is coupled to the shared frame 206 by the at least one spring 208. The enclosure structure 202 may be included in a computing device (not shown) coupled to the device 200 or may be independent of the computing device. In some examples, the enclosure structure 202 may have the shape of a cube, a cylinder or another shape.

The plurality of optical element assemblies 204*a-d* may comprise one or more optical elements. The optical elements may comprise lens, mirrors, prisms, filters or any other component that is configured to manipulate light passing through the one or more optical elements. Light may be focused, for example, due to a diffraction property or a reflective property of the one or more optical elements. Spectral characteristics of the light may also be modified, for example, due to a filter included in the one or more optical elements.

The shared frame 206 in the device 200 is coupled to each of the plurality of optical element assemblies 204*a-d* and is configured to maintain the plurality of optical element assemblies 204*a-d* in the fixed spatial configuration. The shared frame 206 may be, for example, a plastic, a metal or a composite structure that is configured to hold each of the plurality of optical element assemblies 204*a-d* in the fixed spatial arrangement.

The at least one spring 208 may be a compression spring, german hook, english hook or any other spring that is coupled to the shared frame 206 and the enclosure structure 202 to cause the shared frame 206 to move along an axis of motion.

The at least one magnet 210 may be, for example, a permanent magnet that is placed around the shared frame 206 to provide the first magnetic field through the shared frame 206. In other examples, the at least one magnet 210 may include more than one magnet arranged around the shared frame 206 to provide the first magnetic field. In yet another example, the at least one magnet 210 may be an electromagnetic coil.

The electromagnetic coil 212 is coupled to the shared frame and may be configured to receive a controlled current to provide the controlled second magnetic field through the shared frame 206.

The common structure 214 may comprise, for example, a printed circuit board configured to receive data from the plurality of image sensors 216*a-d* indicative of light focused by the plurality of optical element assemblies 204*a-d*. In other examples, the common structure may comprise a plastic, metal or composite structure that is coupled to the plurality of image sensors 216*a-d*.

The plurality of image sensors 216*a-d* may include, for example, an array of semiconductor pixel sensors (e.g., CMOS sensors or similar devices) configured to receive light focused by the plurality of optical element assemblies 204*a-d* and provide data indicative of the light focused by the plurality of optical element assemblies 204*a-d*. In other examples, the plurality of image sensors 216*a-d* may be a charge-coupled device (CCD). In some examples, the plurality of image sensors 216*a-d* may be aligned with optical axes of the plurality of optical element assemblies 204*a-d*.

In the device 200, the plurality of optical element assemblies 204*a-d* is configured in the fixed spatial arrangement such that each of the plurality of optical element assemblies 204*a-d* focuses light onto at least one of the plurality of image sensors 216*a-d* when the shared frame 206 is in a position corresponding to a focus setting of the device 200.

Although illustrated that the device 200 includes four optical element assemblies, the device 200 may include more or less optical element assemblies than illustrated in FIG. 2. For example, the device 200 may include two, three, five or more optical element assemblies configured in the fixed spatial configuration.

In some examples, an optical axis of a given optical element assembly of the plurality of optical element assemblies 204*a-d* is offset from optical axes of other optical element assemblies of the plurality of optical element assemblies 204*a-d* and substantially parallel to the axis of motion of shared frame 206. For example, optical element assembly 204*a* has an optical axis aligned with image sensor 216*a*, and optical element assembly 204*b* has an optical axis aligned with image sensor 216*b*, and so on.

In the device 200, the position of the shared frame 206 corresponds to the focus setting of the device 200. The shared frame 206 is coupled to each of the plurality of optical element assemblies 204a-d, such that a change in the position of shared frame 206 causes a change in a position of each of the plurality of optical element assemblies 204a-d. For example, the change in the position of the shared frame 206 causes the plurality of optical element assemblies 204a-d to move to a different position corresponding to a different focus setting of the device 200. In some examples, the change in the position of the shared frame 206 corresponds to the plurality of optical element assemblies 204a-d moving a substantially same amount of distance.

In some example embodiments of device 200, the focus setting of the device 200 may correspond to the shared frame 206 being in any position along the axis of motion of the shared frame 206. In other examples, a plurality of distinct focus settings may be provided corresponding to a plurality of positions along the axis of motion of the shared frame 206.

In the device 200, the at least one spring 208 is coupled to the shared frame 206 and the enclosure structure 202. The at least one spring 208 may include more than one spring and may be configured, for example, to suspend the shared frame 206 inside the enclosure structure 202. In some examples, the at least one spring 208 may be configured to allow the shared frame 206 to move along the axis of motion.

In the device 200, the at least one magnet 210 provides the first magnetic field through the shared frame 206. The electromagnetic coil 212 may be configured to provide the controlled second magnetic field through the shared frame 206. The controlled second magnetic field interacts with the first magnetic field to cause the change in the position of the shared frame 206. The electromagnetic coil 212 may receive a controlled electric current that corresponds to the second magnetic field. The controlled current may be provided through the common structure 214 or may be provided by other circuitry not shown in the illustration of FIG. 2.

Although illustrated that the interaction between the first magnetic field and the second magnetic field causes the change in the position of the shared frame 206, an alternative implementation to accomplish the change in the position may include an actuator that is configured to cause the change in the position. For example, the actuator may comprise a Voice Coil Motor, piezoelectric actuator, MEMs, shape memory alloy or any other actuator that is configured to cause the controllable change in the position. The actuator may be included in the device 200 to replace or complement one or more of the at least one spring 208, the at least one magnet 210 and the electromagnetic coil 212.

In the device 200, the plurality of image sensors 216a-d may be configured to receive light focused by the plurality of optical element assemblies 204a-d. A given image sensor of the plurality of image sensors 216a-d may be aligned with an optical axis of a given optical element assembly of the plurality of optical element assemblies 204a-d. For example, image sensor 216a may be aligned with the optical axis of optical element assembly 204a. In other examples, the given image sensor may be offset from the given optical element assembly to provide an imaging property of the focus setting of the device 200.

Although illustrated in FIG. 2 that the image sensors 216a-d are individual sensors, the image sensors 216a-d may comprise a shared semiconductor die that includes an arrangement of a plurality of image sensors.

Figure 3:
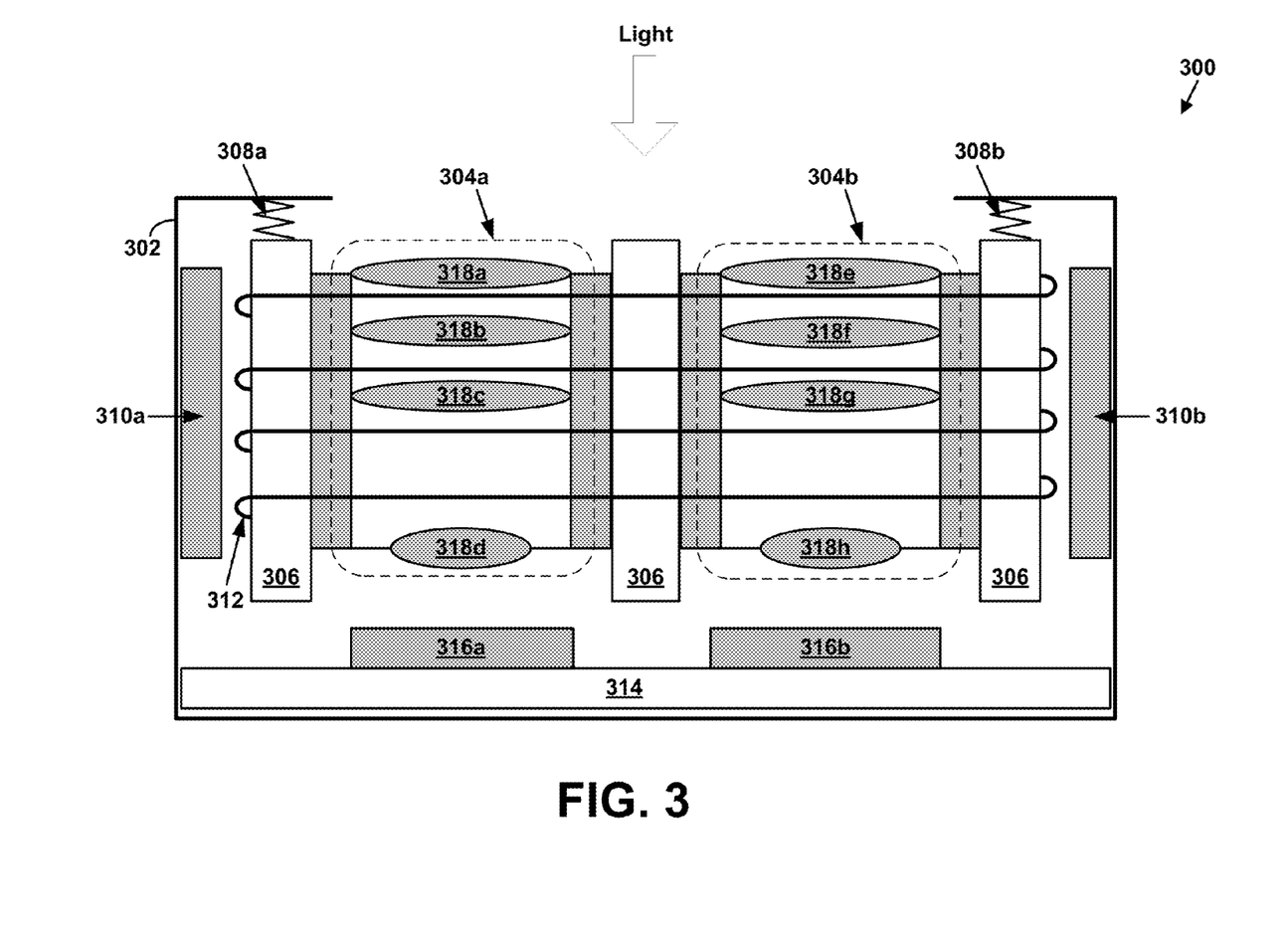
FIG. 3 illustrates a side view cross-section of an example device that may be configured as a multi-aperture lens module.

FIG. 3 illustrates a side view cross-section of an example device 300 that may be configured as a multi-aperture lens module. The device 300 may be similar to or the same as the device 200 shown in FIG. 2 and may include an enclosure structure 302 that houses the various components of the device 300. The device 300 includes a plurality of optical element assemblies 304a-b that are coupled to each other in a fixed spatial arrangement using a shared frame 306. The shared frame 306 maintains the plurality of optical element assemblies 304a-b in the fixed spatial arrangement. The shared frame 306 is coupled to the enclosure structure 302 by springs 308a-b. The device 300 also includes magnets 310a-b that provide a first magnetic field through the shared frame 306. The shared frame 306 is also coupled to an electromagnetic coil 312 that provides a controlled second magnetic field through the shared frame 306. The device 300 also includes a common structure 314 that includes a first image sensor 316a and a second image sensor 316b. The plurality of optical element assemblies 304a-b comprise a plurality of optical elements 318a-h.

Components of the device 300 may be similar to or the same as components of the device 200 shown in FIG. 2. As an example, the plurality of optical elements 318a-h included in the plurality of optical element assemblies 304a-b may comprise lens, mirrors, prisms, filters or any other component that is configured to manipulate light passing through the one or more optical elements. Light may be focused, for example, due to a diffraction property or a reflective property of the one or more optical elements. Spectral characteristics of the light may also be modified, for example, due to a filter included in the one or more optical elements.

In the device 300, the plurality of optical element assemblies 304a-b is configured in the fixed spatial arrangement such that each of the plurality of optical element assemblies 304a-b focuses light onto one of the first image sensor 316a or the second image sensor 316b when the shared frame 306 is in a position corresponding to a focus setting of the device 300. For example, optical element assembly 304a is configured to focus light on the first image sensor 316a, and so on.

The plurality of optical element assemblies 304a-b may be configured in a plurality of configurations to provide imaging properties of the device 300 based on the shared frame 306 being in the position corresponding to the focus setting of the device 300. In FIG. 3, each of the optical element assemblies 304a-b is illustrated at a same distance to the image sensors 316a-b; however, other configurations are possible as well and are herein considered. Below is a description of some example configurations for the plurality of optical element assemblies 304a-b.

In a first example configuration of the plurality of optical element assemblies 304a-b due to the fixed spatial arrangement, optical element assembly 304a is at a given distance from image sensor 316a and optical element assembly 304b is at the given distance from image sensor 316b such that both optical element assembly 304a and optical element assembly 304b provide a substantially same focus distance when the shared frame 306 is in the position corresponding to the focus setting of the device 300.

In a second example configuration of the plurality of optical element assemblies 304a-b due to the fixed spatial arrangement, optical element assembly 304a is at a first distance from image sensor 316a and optical element assembly 304b is at a second distance from image sensor 316b. The first distance and the second distance may be configured such that optical element assembly 304a and optical element assembly 304b provide two distinct focus distances based on the shared frame 306 being in the position corresponding to the focus setting of the device 300.

In a third example configuration, the plurality of optical elements 318a-d included in optical element assembly 304a may be arranged substantially along an optical axis of optical element assembly 304a such that optical element assembly 304a provides a focus distance along the optical axis of optical element assembly 304a.

In a fourth example configuration, at least one of the plurality of optical elements 318a-d is arranged in a position substantially different from a corresponding optical element of the plurality of optical elements 318e-h. For example, optical element 318d in FIG. 3 may be arranged at a first distance from image sensor 316a that is substantially different from a second distance between optical element 318h and image sensor 316b. Thus, in the fourth example configuration, optical element assembly 304a provides a first focus distance that is distinct from a second focus distance provided by optical element assembly 304b.

Although not illustrated in FIG. 3, an additional or alternative implementation to accomplish the example configurations may comprise, for example, configuring the first image sensor 316a and the second image sensor 316b in a second fixed spatial arrangement. The second fixed spatial arrangement may provide the first distance and the second distance that correspond to the two distinct focus distances based on the shared frame 306 being in the position corresponding to the focus setting of the device 300.

The optical element assemblies 304a-b may be configured to move in a direction parallel to an optical axis of the image sensors 316a-b (e.g., shown in FIG. 3 as an axis along which light is received). The optical element assemblies 304a-b may move up and down, or closer to and farther away from the image sensors 316a-b. In some examples, the optical element assemblies 304a-b may also be configured to move in a direction perpendicular to the optical axis of the image sensors 316a-b (or side to side). In still other examples, the optical element assemblies 304a-b may also be configured to move both parallel to and perpendicular to an optical axis so as to move generally diagonal with respect to the optical axis.

Although illustrated in FIG. 3 that the interaction between the magnets 310a-b and the electromagnetic coil 312 causes the change in the position of the shared frame 306, an alternative implementation to accomplish the change in the position may include an actuator that is configured to cause the change in the position. For example, the actuator may comprise a Voice Coil Motor, piezoelectric actuator, MEMs, shape memory alloy or any other actuator that is configured to cause the controlled change in the position. The actuator may be included in the device 300 to replace or complement one or more of the springs 308a-b, the magnets 310a-b and the electromagnetic coil 312.

Figure 4:
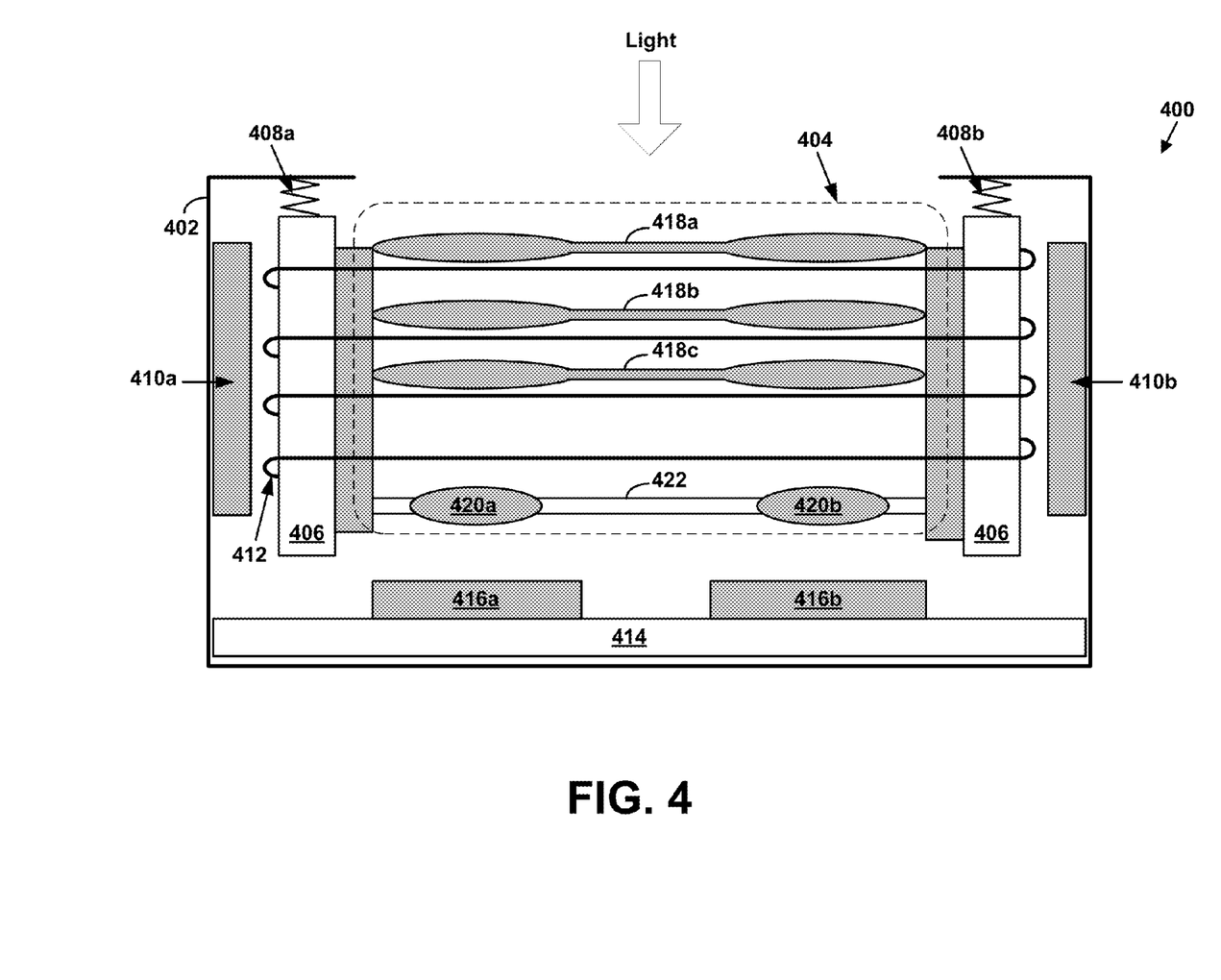
FIG. 4 illustrates a side view cross-section of another example device that may be configured as a multi-aperture lens module.

FIG. 4 illustrates a side view cross-section of another example device 400 that may be configured as a multi-aperture lens module. The device 400 may include an enclosure structure 402 that houses the various components of the device 400. The device 400 includes an optical element assembly 404 that is coupled to a shared frame 406. The shared frame 406 is coupled to the enclosure structure 402 by springs 408a-b. The device 400 also includes the magnets 410a-b that provide a first magnetic field through the shared frame 406. The shared frame 406 is also coupled to an electromagnetic coil 412 that provides a controlled second magnetic field through the shared frame 406. The device 400 also includes a common structure 414 that includes a first image sensor 416a and a second image sensor 416b. The optical element assembly 404 comprises a plurality of optical element panels 418a-c and a plurality of optical elements 420a-b configured in a fixed spatial arrangement. The device 400 also includes a holding structure 422 configured to maintain the plurality of optical elements 420a-b in the fixed spatial arrangement.

Components in the device 400 may be similar to components of the device 200 in FIG. 2, such as the enclosure structure 402, the springs 408a-b, the magnets 410a-b, the electromagnetic coil 412, the common structure 414, the first image sensor 416a and the second image sensor 416b.

The shared frame 406 in the device 400 is coupled to the optical element assembly 404 and is configured to maintain the plurality of optical element panels 418a-c and the plurality of optical elements 420a-b in the fixed spatial configuration. The shared frame 406 may be, for example, a plastic, a metal or a composite structure. Although the illustration in FIG. 4 is only a cross section that does not completely show the shared frame 406, the shared frame 406 may be configured as one structure that may house more than one optical element assembly.

The plurality of optical element panels 418a-c is included in the optical element assembly 404. The plurality of optical element panels 418a-c may comprise plastic lens arrays, glass lens, mirrors, prisms or any other component that is configured to manipulate light passing through the one or more optical elements. Light may be focused, for example, due to a diffraction property or a reflective property of the one or more optical elements. Spectral characteristics of the light may also be modified, for example, due to a filter included in the one or more optical elements.

The plurality of optical elements 420a-b is included in the optical element assembly 404. The plurality of optical elements 420a-b may comprise lens, mirrors, prisms or any other component that is configured to manipulate light passing through the one or more optical elements. Light may be focused, for example, due to a diffraction property or a reflective property of the one or more optical elements. Spectral characteristics of the light may also be modified, for example, due to a filter included in the one or more optical elements.

The holding structure 422 is included in the optical element assembly 404 and configured to maintain the plurality of optical elements 420a-b in the fixed spatial arrangement. The holding structure 422 may comprise, for example, a plastic, metal or composite material coupled to the plurality of optical elements 420a-b in the fixed spatial arrangement.

Although illustrated in FIG. 4 that device 400 includes one optical element assembly 400 coupled to the shared frame 406, in some examples the device 400 may be configured to include two or more optical element assemblies.

In the device 400, light may be focused through the plurality of optical element panels 418a-c and further focused through the plurality of optical elements 420a-b onto the first image sensor 416a and the second image sensor 416b. The plurality of optical element panels 418a-c and the plurality of optical elements 420a-b included in the plurality of optical element assemblies 404 are configured in the fixed spatial arrangement.

In the device 400, the position of the shared frame 406 corresponds to a focus setting of the device 400. The shared frame 406 is coupled to optical element assembly 404, such that a change in the position of shared frame 406 causes a change in a position of each of the plurality of optical element panels 418a-c and each of the plurality of optical elements 420a-b while maintaining the fixed spatial arrangement. For example, the change in the position of the shared frame 406 causes the optical element assembly 404 to move to a different position corresponding to a changed focus setting of the device 400. In some examples, the change in the position of the shared frame 406 corresponds to the plurality of optical element panels 418*a-c* and the plurality of optical elements 420*a-b* moving a substantially same amount of distance.

In some example embodiments of device 400, the focus setting of the device 400 may correspond to the shared frame 406 being in any position along an axis of motion of the shared frame 406. In other examples, a plurality of distinct focus settings may be provided corresponding to a plurality of positions along the axis of motion of the shared frame 406.

Although illustrated in FIG. 4 that the interaction between the magnets 410*a-b* and the electromagnetic coil 412 causes the change in the position of the shared frame 406, an alternative implementation to accomplish the change in the position may include an actuator that is configured to cause the change in the position. For example, the actuator may comprise a Voice Coil Motor, piezoelectric actuator, MEMs, shape memory alloy or any other actuator that is configured to cause the controlled change in the position. The actuator may be included in the device 400 to replace or complement one or more of the springs 408*a-b*, the magnets 410*a-b* and the electromagnetic coil 412.

Figure 5:
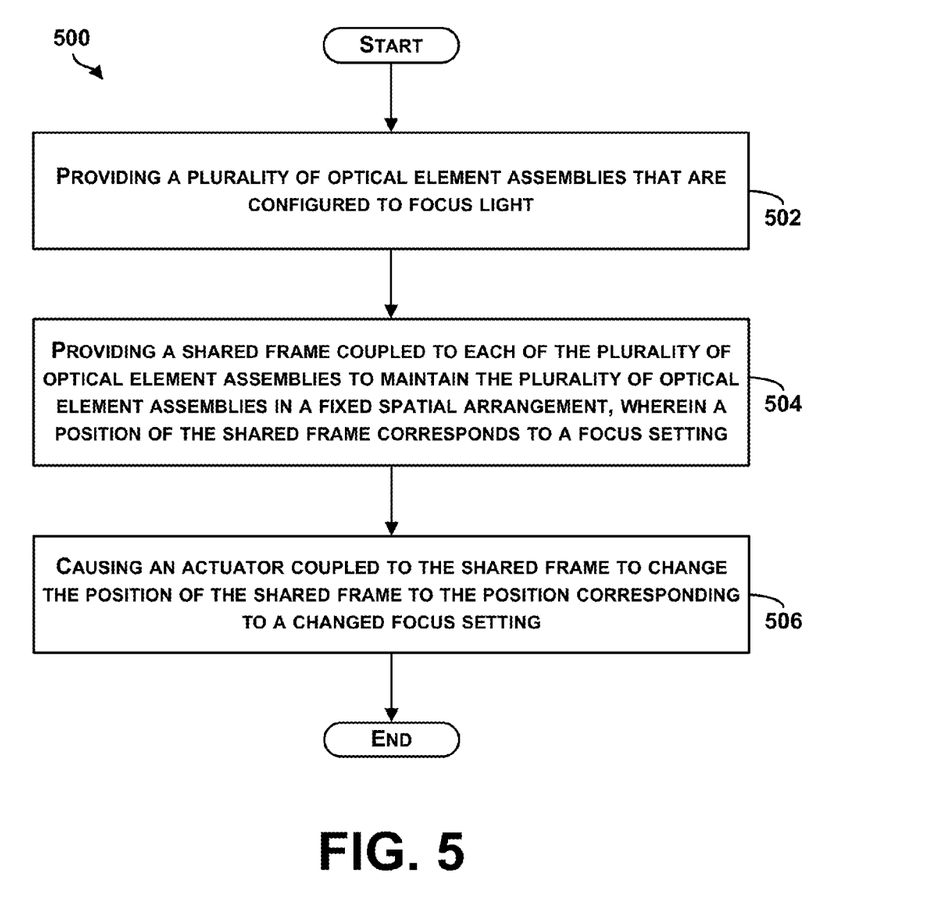
FIG. 5 is a block diagram of an example method for providing focus settings of an imaging device, in accordance with at least some embodiments described herein.

FIG. 5 is a block diagram of an example method for providing focus settings of an imaging device, in accordance with at least some embodiments described herein. Method 500 shown in FIG. 5 presents an embodiment of a method that could be used with the devices 100, 200, 300, and 400, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of a manufacturing or operation process.

At block 502, the method 500 includes providing a plurality of optical element assemblies that are configured to focus light.

At block 504, the method 500 includes providing a shared frame coupled to the plurality of optical element assemblies and configured to maintain the plurality of optical element assemblies in a fixed spatial arrangement. A position of the shared frame corresponds to the plurality of optical element assemblies being configured in a focus setting. For example, the focus setting may correspond to the shared frame being in the position.

At block 506, the method 500 includes causing an actuator coupled to the shared frame to change the position of the shared frame. The change in the position of the shared frame corresponds to a change in the focus setting and causes the plurality of optical element assemblies to be configured in the changed focus setting.

In some examples, two or more focus settings may correspond to a same image focus due to the fixed spatial arrangement of the plurality of optical element assemblies. For example, two of the plurality of optical element assemblies may be configured at a different distance from a corresponding image sensor based on the shared frame being in the position. Within examples, a first optical element assembly of the two of the plurality of optical element assemblies may provide a first image focus distance when the shared frame is in a first position. A second optical element assembly of the two of the plurality of optical element assemblies may provide a second image focus when the shared frame is in the first position. In some instances, it may be desirable that two or more focus settings correspond to the same image focus distance. For example, the change in the position of the shared frame to the first position may correspond to a different energy requirement compared to the change in the position of the shared frame to the second position. In other instances, it may be desirable that two or more optical element assemblies provide two or more distinct focus distances based on the shared frame being in the position. For example, the device may be configured to capture elements of a scene placed at different distances from the device simultaneously.

Operation of the imaging device may be controlled, for example, by power input to the imaging device, or by other components, circuitry, or processors coupled to the imaging device.

Example imaging devices may include, for example, document and image scanners, barcode readers, copiers, cameras, video cameras, microscopes, hand-held devices, head-mounted devices or telescopes. Within examples, focusing techniques that are described for the imaging device can be applied to other electronic devices that focus light. For example, projection displays and industrial laser etching systems may focus light using the methods described herein. Thus, example methods herein provide light focusing techniques that involve a plurality of optical element assemblies that may share an actuator to perform a change in a position of the plurality of optical element assemblies.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A device comprising:
  a plurality of optical element assemblies configured to focus light, wherein a first optical element assembly of the plurality of optical element assemblies includes a first plurality of optical elements configured in a first fixed spatial arrangement, and wherein a second optical element assembly of the plurality of optical element assemblies includes a second plurality of optical elements configured in a second fixed spatial arrangement, and wherein the first optical element assembly and the second optical element assembly provide two distinct focus distances due to the first fixed spatial arrangement and the second fixed spatial arrangement;
  a shared frame coupled to each of the plurality of optical element assemblies and configured to maintain the plurality of optical element assemblies in a fixed spatial arrangement, wherein a position of the shared frame corresponds to the plurality of optical element assemblies being configured in a focus setting of the device; and an actuator coupled to the shared frame and configured to cause a change in the position of the shared frame, wherein the change in the position of the shared frame corresponds to a change in the focus setting of the device and causes the plurality of optical element assemblies to move a same amount of distance and be configured in the changed focus setting of the device.

2. The device of claim 1, wherein optical axes of the plurality of optical element assemblies are substantially parallel to an axis of motion of the shared frame.

3. The device of claim 1, further comprising:
a first image sensor that is substantially aligned with the first optical element assembly of the plurality of optical element assemblies and provided at a first distance from the first optical element assembly;
a second image sensor that is substantially aligned with the second optical element assembly of the plurality of optical element assemblies and provided at a second distance from the second optical element assembly; and
wherein the first distance and the second distance are configured to provide the two distinct focus distances for the device based on the shared frame being in the position.

4. The device of claim 1, further comprising:
at least one spring coupled to the shared frame that is configured to cause the shared frame to move along an axis of motion; and
an enclosure structure, wherein the shared frame, the at least one spring, the plurality of optical element assemblies and the actuator are disposed inside the enclosure structure, and wherein the shared frame is suspended in the enclosure structure by the at least one spring.

5. The device of claim 1, wherein the actuator comprises:
at least one magnet configured to provide a first magnetic field through the shared frame; and
an electromagnetic coil coupled to the shared frame and configured to provide a controlled second magnetic field that interacts with the first magnetic field to cause the change in the position of the shared frame.

6. The device of claim 1, wherein the actuator comprises a voice coil motor, a piezoelectric actuator, MEMS or a shape memory alloy.

7. The device of claim 1, wherein the plurality of optical element assemblies comprises a plurality of optical element panels including a plurality of optical elements that are coupled substantially along a plane and configured to focus light travelling through the plane.

8. The device of claim 7, wherein the plurality of optical element assemblies further comprises a third plurality of optical elements configured to further focus light from the plurality of optical element panels onto a plurality of image sensors, and wherein the third plurality of optical elements are configured in the fixed spatial arrangement due to a holding structure coupled to the third plurality of optical elements.

9. A method comprising:
providing a plurality of optical element assemblies that are configured to focus light, wherein a first optical element assembly of the plurality of optical element assemblies includes a first plurality of optical elements configured in a first fixed spatial arrangement, and wherein a second optical element assembly of the plurality of optical element assemblies includes a second plurality of optical elements configured in a second fixed spatial arrangement, and wherein the first optical element assembly and the second optical element assembly provide two distinct focus distances due to the first fixed spatial arrangement and the second fixed spatial arrangement;

providing a shared frame coupled to each of the plurality of optical element assemblies configured to maintain the plurality of optical element assemblies in a fixed spatial arrangement, wherein a position of the shared frame corresponds to the plurality of optical element assemblies being configured in a focus setting; and causing an actuator coupled to the shared frame to change the position of the shared frame, wherein the change in the position of the shared frame corresponds to a change in the focus setting and causes the plurality of optical element assemblies to move a same amount of distance and be configured in the changed focus setting.

10. A device comprising:
a plurality of optical element assemblies configured to focus light, wherein a first optical element assembly of the plurality of optical element assemblies includes a first plurality of optical elements configured in a first fixed spatial arrangement, and wherein a second optical element assembly of the plurality of optical element assemblies includes a second plurality of optical elements configured in a second fixed spatial arrangement, and wherein the first optical element assembly and the second optical element assembly provide two distinct focus distances due to the first fixed spatial arrangement and the second fixed spatial arrangement;
a shared frame coupled to each of the plurality of optical element assemblies and configured to maintain the plurality of optical element assemblies in a fixed spatial arrangement, wherein a position of the shared frame corresponds to the plurality of optical element assemblies being configured in a focus setting of the device;
a plurality of image sensors aligned with the plurality of optical element assemblies and configured to receive light focused by the plurality of optical element assemblies; and
an actuator coupled to the shared frame and configured to cause a change in the position of the shared frame, wherein the change in the position of the shared frame corresponds to a change in the focus setting of the device and causes the plurality of optical element assemblies to move a same amount of distance and be configured in the changed focus setting of the device.

11. The device of claim 10, wherein the plurality of image sensors are configured in another fixed spatial arrangement to provide at least the two distinct focus distances based on the shared frame being in the position.

12. The device of claim 10, further comprising:
a common structure coupled to the plurality of image sensors, wherein each of the plurality of image sensors is aligned with an optical axis of a given optical element assembly of the plurality of optical element assemblies.

13. The device of claim 12, wherein the common structure comprises a printed circuit board that is configured to receive data from the plurality of image sensors indicative of light focused by the plurality of optical element assemblies.

14. The device of claim 10, wherein the plurality of image sensors is included in a shared semiconductor die configured to receive light focused by the plurality of optical element assemblies.

* * * * *